(12) United States Patent
Zou (10) Patent No.: US 7,489,955 B2
(45) Date of Patent: *Feb. 10, 2009

(54) FOLDABLE MOBILE TELEPHONE WITH MOVABLE HINGE UNIT

(75) Inventor: Zhi-Gang Zou, Shenzhen (CN)

(73) Assignees: Shenzhen Futaihong Precision Industrial Co., Ltd, Shenzhen, Guangdong Province (CN); Sutech Trading Limited, Road Town, Tortola (VG)

( * ) Notice: Subject to any disclaimer, the term of this patent is extended or adjusted under 35 U.S.C. 154(b) by 656 days.

This patent is subject to a terminal disclaimer.

(21) Appl. No.: 11/107,178

(22) Filed: Apr. 15, 2005

(65) Prior Publication Data

US 2005/0266900 A1 Dec. 1, 2005

(30) Foreign Application Priority Data

May 28, 2004 (TW) .............................. 93208422 U (51) Int. Cl.
*H04M 1/10* (2006.01)
(52) U.S. Cl. .............. 455/575.3; 455/575.1; 455/575.2; 379/433.13
(58) Field of Classification Search .............. 455/575.3, 455/575.1; 379/433.13
See application file for complete search history.

(56) References Cited

U.S. PATENT DOCUMENTS 6,149,442 A * 11/2000 Enright ........................ 439/31
2004/0077199 A1* 4/2004 Winstead et al. ............ 439/165

* cited by examiner

*Primary Examiner*—Matthew D Anderson
*Assistant Examiner*—Adel Youssef
(74) *Attorney, Agent, or Firm*—Morris Manning Martin LLP; Tim Tingkang Xia (57) ABSTRACT

A foldable mobile telephone includes a first housing (10), a second housing (20), and a connecting unit (30). The connecting unit includes a first connecting block (304), a second connecting block (306), and a hinge (302). The first connecting block and the second connecting block are coupled together via the hinge. A flexible cable to establish electrical connection between the first and second housings is incorporated in the hinge. Two electrical connectors are associated with the first and second connecting blocks respectively. The electrical connectors are electrically connected with each other via the flexible cable. The connecting unit is movably connected with the first and second housings. The first housing is connected with the first connecting block. The second housing is connected with the second connecting block. The first housing is pivotable about the second housing via the hinge at either of two sides of the foldable mobile telephone.

15 Claims, 6 Drawing Sheets

FOLDABLE MOBILE TELEPHONE WITH MOVABLE HINGE UNIT

CROSS REFERENCE TO RELATED APPLICATION

The present invention is related to another patent application, entitled "Foldable Mobile Telephone With Movable Hinge", filed on Apr. 15, 2005 with application Ser. No. 11/107,676 and assigned to the same assignee.

FIELD OF THE INVENTION

The present invention relates to foldable mobile telephones, and particularly to a foldable mobile telephone which can be hinged at any of plural locations by the same hinge unit thereof.

BACKGROUND

Nowadays, foldable mobile telephones are being utilized by a large number of private and business users. These mobile telephones are compact and easy to carry when folded. In addition, the keypad is located inside the folded mobile telephone, and is thus protected from inadvertent operation and damage.

As the technology of mobile telephones advances, numerous different functional software is being incorporated into them, such as on-line games. In fact, on-line game software is now considered by many to be a mainstream application. Network game development companies are continually introducing various new on-line network games in prolific quantities, and these network games now occupy a significant market position. In addition, the plethora of available on-line games is attracting an increasing number of users.

Accordingly, mobile telephones are increasingly being developed with game playing functions. Many currently available mobile telephones have pre-installed game software, and can download new games from sources such as a network to provide even further recreation.

As one example in the art, Nokia Corporation has produced a game mobile telephone known as N-Gage. The shape of N-Gage is substantially quadrate. A screen is arranged in a middle of a main body of the mobile telephone. A split keypad is arranged on two sides of the screen. However, the size of the mobile telephone is rather large. For example, it is not very comfortable to hold the mobile telephone when phoning.

As another example in the art, Sony Ericsson Corporation provides a game mobile telephone marketed under the model number Z608. The mobile telephone has an external gameboard for playing games. When users want to play games, it is necessary to connect the gameboard to a housing of the mobile telephone through a connector. However, the gameboard is not convenient to carry. In addition, repeated connecting and disconnecting of the connector may eventually weaken the connection and adversely affect the operation of playing games.

What is needed, therefore, is a foldable mobile telephone on which games can be conveniently played and which can be conveniently carried.

SUMMARY

A foldable mobile telephone of a preferred embodiment includes a first housing, a second housing and a connecting unit. The connecting unit includes a first connecting block, a second connecting block, and a hinge. The first connecting block and the second connecting block are coupled together via the hinge. A flexible cable to establish electrical connection between the first and second housings is incorporated in the hinge. Two electrical connectors are associated with the first and second connecting blocks respectively. The electrical connectors are electrically connected with each other via the flexible cable. The connecting unit is movably connected with the first and second housings. The first housing is connected with the first connecting block. The second housing is connected with the second connecting block. The first housing is pivotable about the second housing via the hinge at either of two sides of the foldable mobile telephone.

The connecting movably connected with the first and second housings, and the first housing is pivotable about the second housing via the hinge at either of two sides of the foldable mobile telephone. Therefore, the foldable mobile telephone can be opened breadthwise or lengthwise as desired. The operability and convenience of the foldable mobile telephone are thus improved.

Other objects, advantages and novel features will become more apparent from the following detailed description of preferred embodiments when taken in conjunction with the accompanying drawings, in which:

DETAILED DESCRIPTION OF THE EMBODIMENTS

Figure 1:
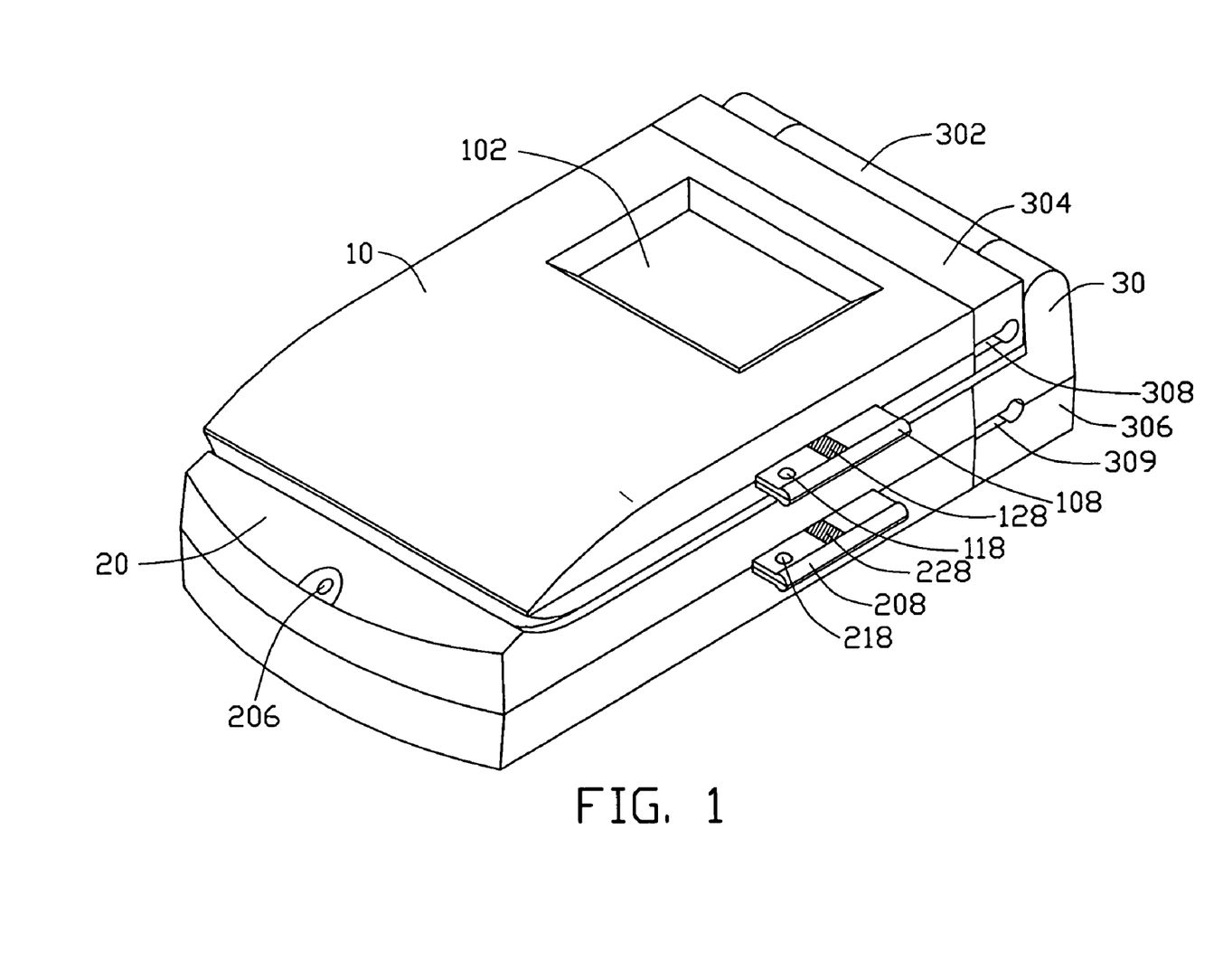
FIG. 1 is an isometric view of a foldable mobile telephone according to a preferred embodiment of the present invention, showing the foldable mobile telephone in a first folded state.
Figure 3:
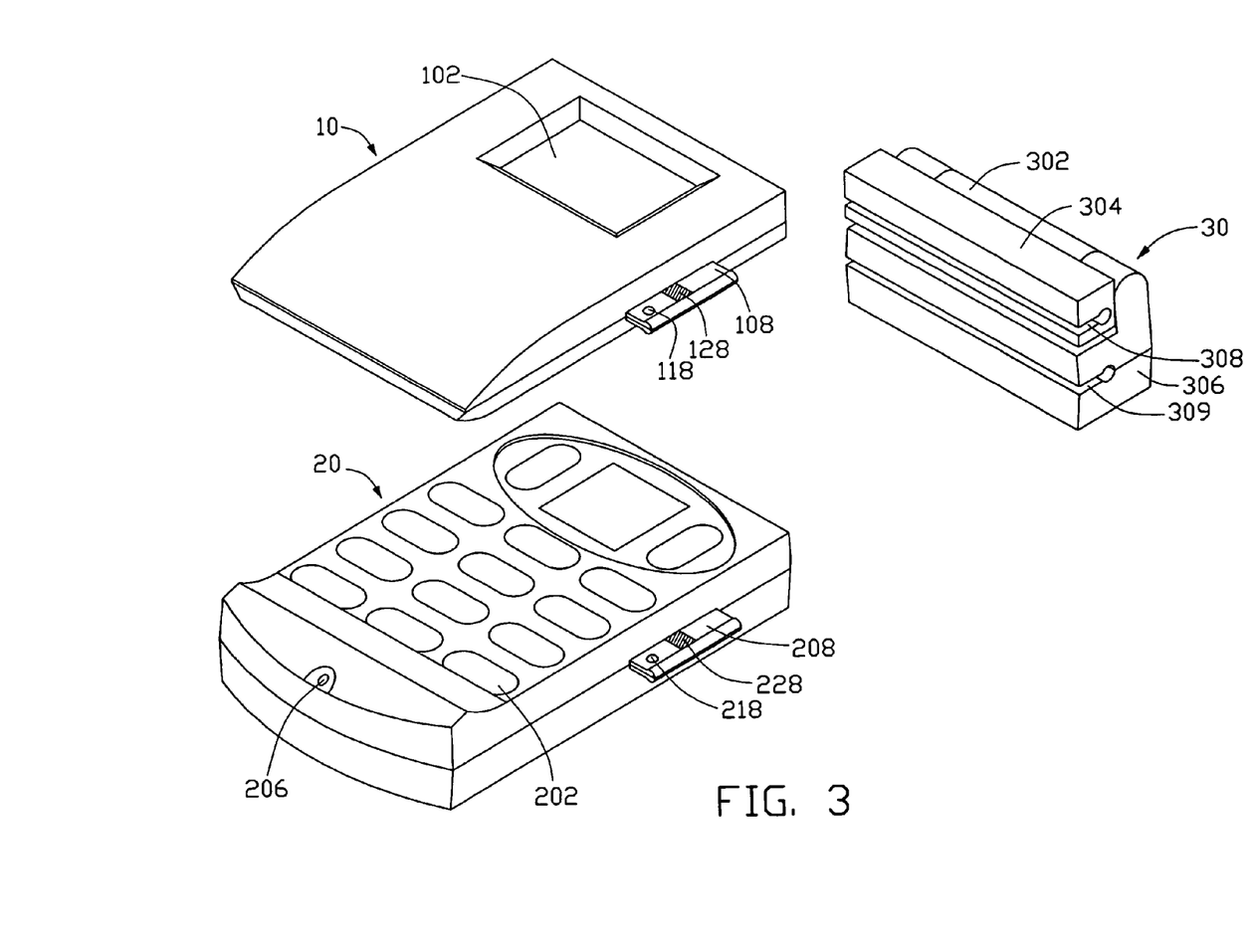
FIG. 3 is an exploded view of the foldable mobile telephone of FIG. 1.
Figure 5:
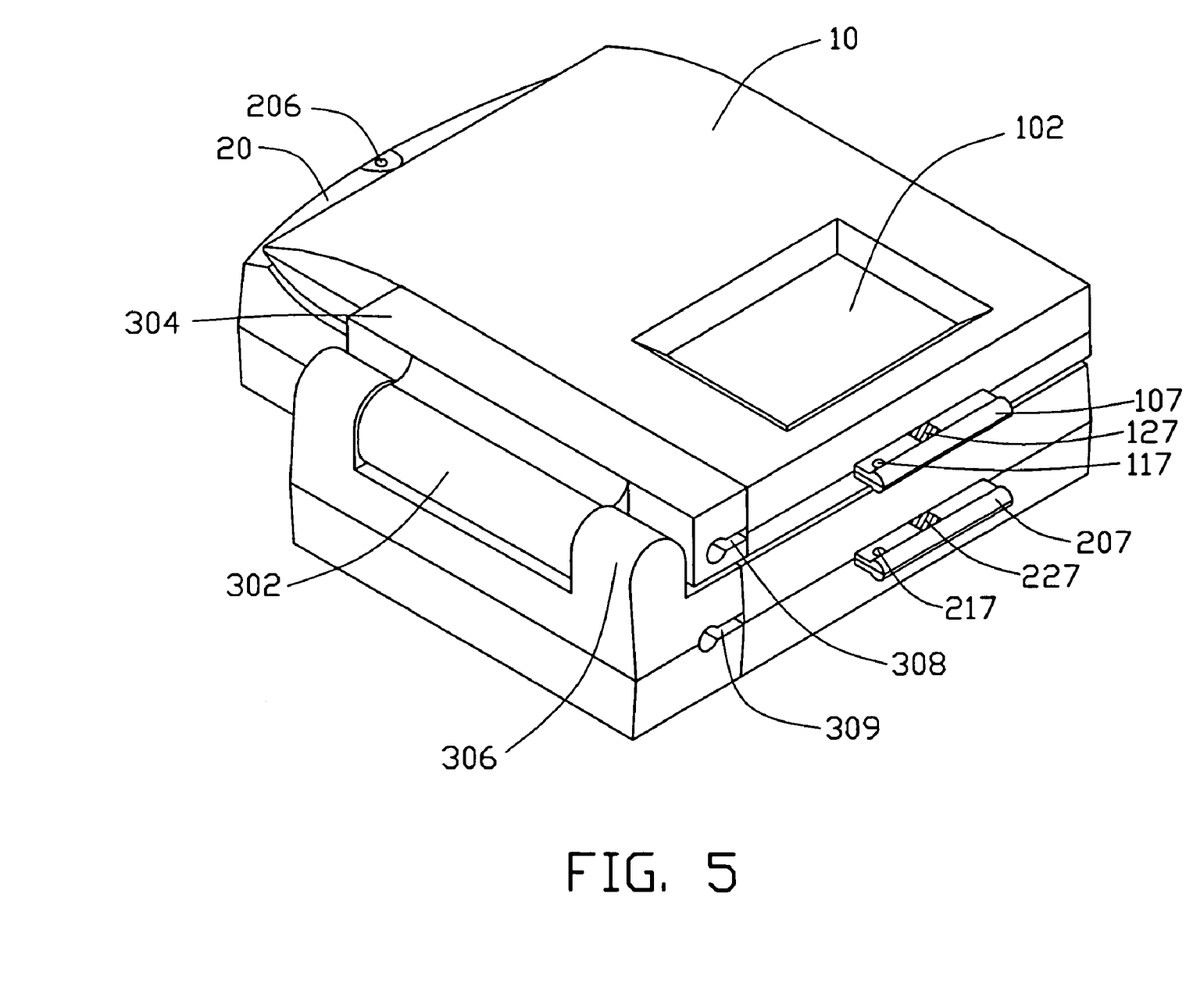
FIG. 5 is an isometric view of the foldable mobile telephone according to the preferred embodiment of the present invention, showing the foldable mobile telephone in a second folded state.

Referring to FIG. 1 and FIG. 3, a foldable electronic device like a foldable mobile telephone according to a preferred embodiment of the present invention includes a first housing 10, a second housing 20, a connecting unit 30. The connecting unit 30 is movably connected with both the first and second housings 10, 20. The connecting unit 30 has, inter alia, a first position (see FIG. 1) and a second position (see FIG. 5).

Figure 2:
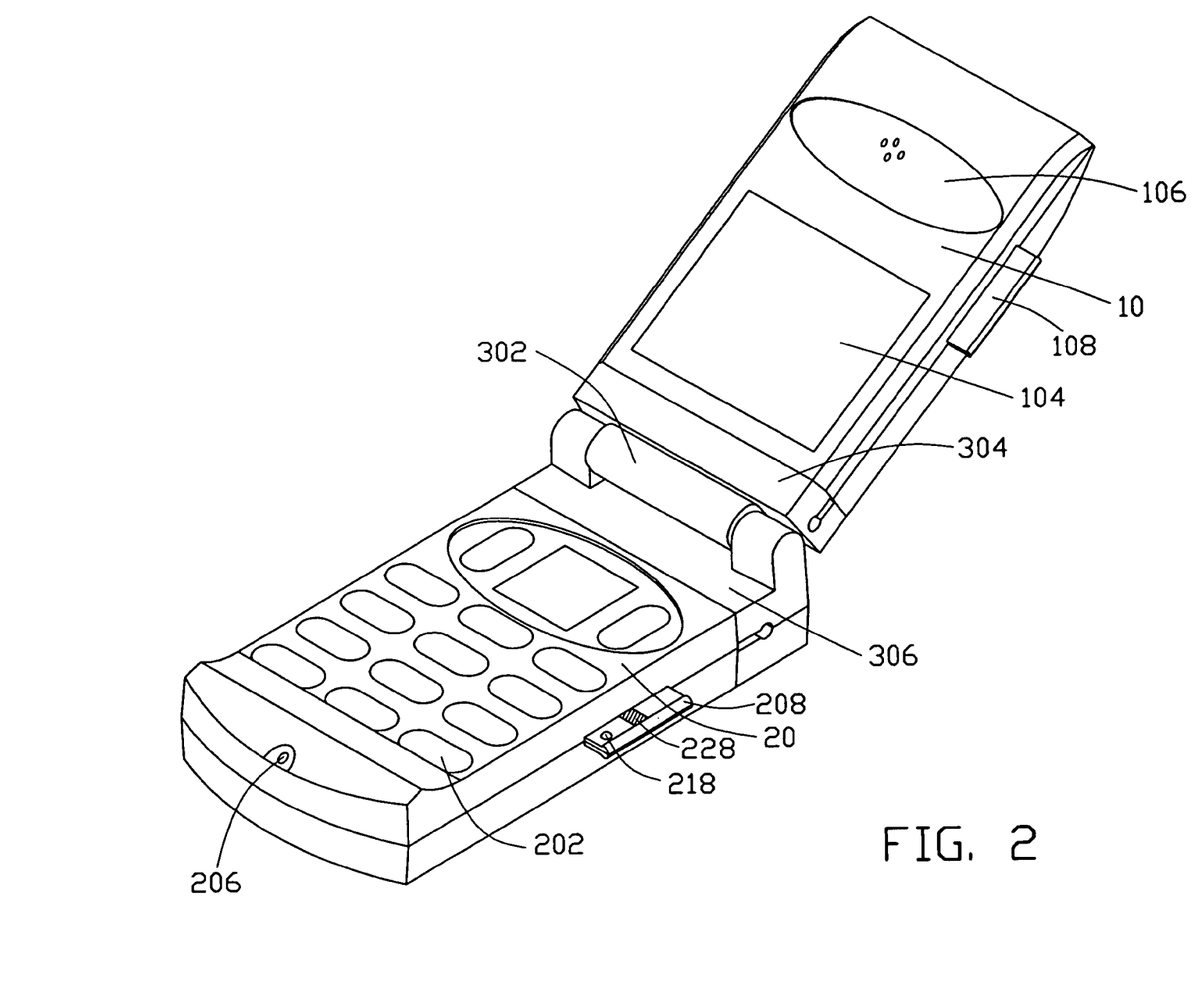
FIG. 2 is similar to FIG. 1, but showing the foldable mobile telephone in a first unfolded state.
Figure 4:
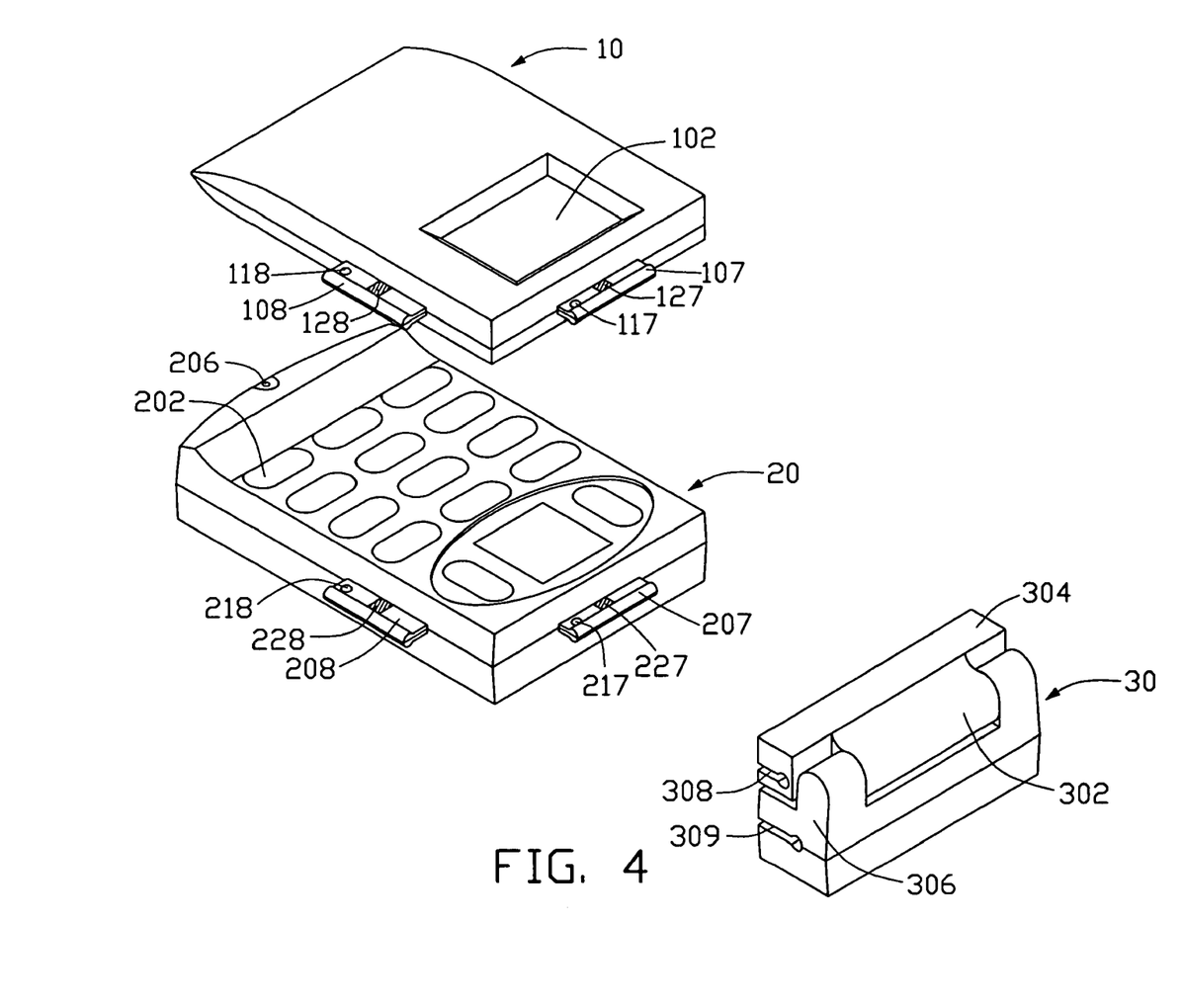
FIG. 4 is similar to FIG. 3, but viewed from another aspect.

Referring also to FIG. 2 and FIG. 4, the first housing 10 includes a first display 102 and a second display 104. The first display 102 is arranged so as to be located at an outer side when the foldable mobile telephone is folded. The outer side refers to an upper side of the first housing 10 distal from the second housing 20 when the foldable mobile telephone is folded. The second display 104 is arranged so as to be located at an inner side when the foldable mobile telephone is folded. The inner side refers to the side where the first housing 10 and the second housing 20 abut against each other when the foldable mobile telephone is folded. A speaker 106 used in conversation is provided in the first housing 10 adjacent the second display 104. A projection 107 extends from a top side of the first housing 10. A projection 108 extends from a right side of the first housing 10. Two electrical connectors 127, 128 are arranged respectively on the projections 107, 108. Both of the electrical connectors 127, 128 are connected with a circuit board inside the first housing 10. A distal edge portion of each of the projections 107, 108 is essentially in the form of an enlarged round rod. A bulge 117 is provided on one side of the projection 107 for orientation. A bulge 118 is provided on one side of the projection 108 for orientation. The bulges 117, 118 are elastic and smooth.

The second housing 20 includes a keypad 202 arranged so as to be located at an inner side of the second housing 20 when the foldable mobile telephone is folded. The keypad 202 has a plurality of keys (not labeled). Some of the keys have different functions between the connecting unit 30 in the first position (see FIG. 2) and in the second position (see FIG. 6). And this can be accomplished using hardware and/or software in many different ways. For example, a bi-directional selection key (not shown) is defined and operable along a predetermined lengthwise direction in the first position for an up-and-down selective function thereof, and is defined and operable along a breadthwise direction perpendicular to the lengthwise direction in the second position for a left-and-right selective function instead. A mouthpiece microphone 206 used in conversation is provided below the keypad 202. A projection 207 extends from a top side of the second housing 20. A projection 208 extends from a right side of the second housing 20. Two electrical connectors 227, 228 are arranged respectively on the projections 207, 208. Both of the electrical connectors 227, 228 are connected with a circuit board inside the second housing 20. A distal edge portion of each of the projections 207, 208 is essentially in the form of an enlarged round rod. A bulge 217 is provided on one side of the projection 207 for orientation. A bulge 218 is provided on one side of the projection 208 for orientation. The bulges 217, 218 are elastic and smooth.

The connecting unit 30 includes a hinge 302, a first connecting block 304, and a second connecting block 306. The first connecting block 304 and the second connecting block 306 are coupled together via the hinge 302. The connecting unit 30 has a foldable configuration through movement of the hinge 302. A first channel 308 is defined in the first connecting block 304. A second channel 309 is defined in the second connecting block 306. A flexible cable (not shown) is incorporated in the hinge 302, to establish electrical connection between the first and second housings 10, 20. Two electrical connectors (not shown) are arranged on inners sides of the first and second channels 308, 309 respectively. One end of the flexible cable is connected with the electrical connector of the first channel 308. The other end of the flexible cable is connected with the electrical connector of the second channel 309. The electrical connector of the first channel 308 can cooperate with the electrical connectors 127, 128. The electrical connector of the second channel 309 can cooperate with the electrical connectors 227, 228. An inmost portion of each of the channels 308, 309 is essentially in the form of an enlarged cylindrical passage. The inmost portion of the first channel 308 can slidably receive the distal edge portions of the projections 107, 108. The inmost portion of the second channel 309 can slidably receive the distal edge portions of the projections 207, 208. A width of the first channel 308 is roughly equal to or slightly larger than a thickness of the projections 107, 108. A width of the second channel 309 is roughly equal to or slightly larger than a thickness of the projections 207, 208. Thus the projections 107, 108 can slide in the first channel 308, and the projections 207, 208 can slide in the second channel 309. A dent (not visible) is provided in an inside surface of the first channel 308, for accepting the bulges 117, 118. Another dent (not visible) is provided in an inside surface of the second channel 309, for accepting the bulges 217, 218.

When the connecting unit 30 is in the first position, the bulges 117, 217 are respectively engaged in the dents of the inside surfaces of the channels 308, 309 to establish a first mechanical connection between the first and second housings 10, 20. The foldable mobile telephone can be folded and unfolded about its top side through movement of the hinge 302. The unfolded state of the foldable mobile telephone is shown in FIG. 2. The keypad 202 is operated lengthwise. With the respective cooperation of the electrical connectors 127, 227 and the electrical connectors of the first and second channels 308, 309, a first electrical connection between the first and second housings 10, 20 is established.

Figure 6:
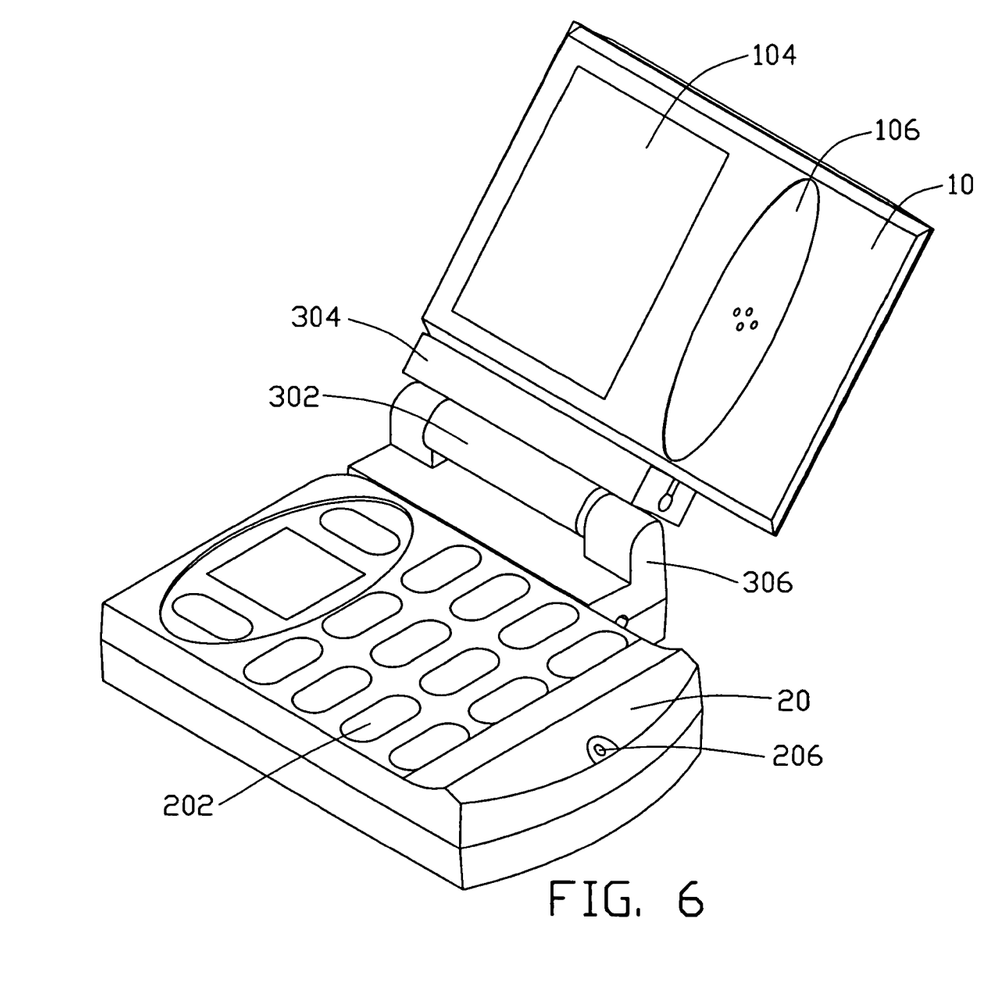
FIG. 6 is similar to FIG. 5, but viewed from another aspect and showing the foldable mobile telephone in a second unfolded state.

To move the connecting unit 30 from the first position to the second position, the connecting unit 30 is gripped by a user and pulled rightward. The elastic bulges 117, 217 disengage from the dents of the channels 308, 309. Subsequently, the projections 107, 207 exit the channels 308, 309, and the connecting unit 30 is separated from the first and second housings 10, 20 (see FIG. 3 and FIG. 4). Then the projections 108, 208 are pushed in the channels 308, 309 respectively to establish a second mechanical connection between the first and second housings 10, 20. Subsequently, the elastic bulges 118, 218 engage in the dents of the channels 308, 309. The connecting unit 30 is thus held in the second position (see FIG. 5). With the respective cooperation of the electrical connectors 128, 228 and the electrical connectors of the first and second channels 308, 309, a second electrical connection between the first and second housings 10, 20 is established. The foldable mobile telephone can be folded and unfolded about its right side through movement of the hinge 302. The unfolded state of the foldable mobile telephone is shown in FIG. 6. Because the keypad 202 is arranged breadthwise relative to the second display 104, it is convenient to operate the keypad 202 breadthwise with two hands when performing activities such as playing games. Therefore, the operability and convenience of the foldable mobile telephone are improved.

Furthermore, if desired, one of the first and second housings 10, 20 can be fixedly connected with the connecting unit 30, with the other of the first and second housings 10, 20 being movably connected with the connecting unit 30. For example, the first connecting block 304 of the connecting unit 30 can be fixedly connected with the first housing 10, with the second connecting block 306 being movably connected with the second housing 20. The user can move the second housing 20 from a position where it directly underlies the first housing 10 (see FIG. 1) to a position where it transversely underlies the first housing 10. In such position, the foldable mobile telephone is defined to be in a third position. In the third position, not only is the keypad 202 arranged breadthwise relative to the second display 104, but the second display 104 itself is also arranged breadthwise.

Moreover, other connection means can be employed between the connecting unit 30 and the first and second housings 10, 20. In one example, a first projection extends from the first connecting block 304, and a second projection extends from the second connecting block 306. Two electrical connectors are arranged on the first and second projections respectively. Two channels are defined in first sides of the first and second housings 10, 20 respectively. Two channels are defined in second sides of the first and second housings 10, 20 respectively, the second sides adjoining the corresponding first sides. Four electrical connectors are arranged on inner sides of the channels respectively. The electrical connectors of the channels cooperate with the electrical connectors of the projections to establish electrical connection between the first and second housings 10, 20. With the cooperation of the above-mentioned channels and projections, movable connection between the connecting unit 30 and the first and second housings 10, 20 is realized.

It is to be understood that the elastic bulges 117, 118, 217, 218 can be configured as hollow elastic protrusions. For example, base portions of the protrusions are fixed to the projections 107, 108, 207, 208, and distal surfaces of the protrusions are smooth for easy sliding. In one embodiment, the protrusions can have a kind of "omega" (Ω) configuration. Furthermore, the elastic bulges 117, 118, 217, 218 can be configured as spring-loaded ball bearings contained in sockets of the projections 107, 108, 207, 208.

It is to be further understood that even though numerous characteristics and advantages of the embodiments have been set forth in the foregoing description, the disclosure is illustrative only, and changes may be made in detail, especially in matters of shape, size, and arrangement of parts within the principles of the invention indicated by the broad general meaning of the terms in which the appended claims are expressed.

I claim:

1. A foldable mobile telephone comprising:
   a first housing;
   a second housing; and
   a connecting unit, the connecting unit comprising a first connecting block, a second connecting block and a hinge, the first connecting block and the second connecting block being coupled together via the hinge, a flexible cable to establish electrical connection between the first and second housings being incorporated in the hinge, two electrical connectors being associated with the first and second connecting blocks respectively, the electrical connectors being electrically connected with each other via the flexible cable;
   wherein the connecting unit is removably connected with the first and second housings, the first housing is connected with the first connecting block, the second housing is connected with the second connecting block, and the first housing is pivotable about the second housing via the hinge at either of two sides of the foldable mobile telephone,
   wherein two projections extend from first sides of the first and second housings respectively, and two projections extend from second sides of the first and second housings respectively, the second sides adjoining the first sides, and four electrical connectors are respectively associated with the projections and can cooperate with the electrical connectors.

2. The foldable mobile telephone as claimed in claim 1, wherein the first connecting block defines a first channel, the second connecting block defines a second channel, and the electrical connectors are arranged on inner sides of the first and second channels respectively.

3. The foldable mobile telephone as claimed in claim 2, wherein a first projection extends from the first connecting block, a second projection extends from the second connecting block, and the electrical connectors are respectively arranged on the first and second projections.

4. The foldable mobile telephone as claimed in claim 3, wherein first sides of the first and second housings defined two channels respectively, and second sides of the first and second housings define two channels respectively, the second sides adjoining the first sides, and four electrical connectors are arranged on inner sides of the channels respectively, and can cooperate with the connectors of the projections.

5. The foldable mobile telephone as claimed in claim 3, wherein a width of each channel is equal to or slightly larger than a thickness of the corresponding projection, whereby the projections can slide in the corresponding channels.

6. The foldable mobile telephone as claimed in claim 3, wherein a distal edge portion of each projection is enlarged.

7. The foldable mobile telephone as claimed in claim 6, wherein an inmost portion of each channel is enlarged, for slideably receiving the distal edge portion of the corresponding projection.

8. The foldable mobile telephone as claimed in claim 3, wherein a bulge is provided on each projection.

9. The foldable mobile telephone as claimed in claim 8, wherein each channel defines a dent for accepting the corresponding bulge.

10. A foldable electronic device comprising:
    one housing enclosing parts of said foldable electronic device; and
    another housing enclosing other parts of said foldable electronic device and removably disposed next to said one housing between a first position located at a periphery of said one housing and a second position located at said periphery of said one housing other than said first position thereof, said another housing having a first mechanical connection to said one housing in said first position, and having a second mechanical connection to said one housing different from said first mechanical connection in said second position, wherein two projections extend from first sides of the one and another housings respectively, and two projections extend from second sides of the one and another housings respectively, the second sides adjoining the first sides, and four electrical connectors are respectively associated with the projections.

11. The foldable electronic device as claimed in claim 10, wherein said first mechanical connection is established by means of a mechanical connection of said another housing to a first projection extending from said one housing in said first position, and said second mechanical connection is established by means of a mechanical connection of said another housing to a second projection extending from said one housing in said second position.

12. The foldable electronic device as claimed in claim 10, wherein a first electrical connection is established between said one and another housings in case that said another housing is in said first position, and a second electrical connection, different from said first electrical connection, is established between said one and another housings in case that said another housing is in said second position.

13. The foldable electronic device as claimed in claim 10, wherein said another housing is rotatably movable relative to said one housing in said first position thereof along a predetermined direction, and rotatably movable relative to said one housing in said second position thereof along another direction different from said predetermined direction.

14. A foldable electronic device comprising:
    one housing enclosing parts of said foldable electronic device;
    another housing enclosing other parts of said electronic device, said another housing disposed next to said one housing and movable relative to said one housing at one of a first position and a second position at a periphery of said one housing; and
    at least one key formed on said one housing and user-approachable when said another housing is in said first and second positions, said at least one key functioning defined along a first operable direction in case that said another housing is in said first position, and functioning defined along a second operable direction other than said first operable direction in case that said another housing is in said second position; wherein two projections extend from first sides of the one and another housings respectively, and two projections extend from second sides of the one and another housings respectively, the second sides adjoining the first sides, and four electrical connectors are respectively associated with the projections.

15. The foldable electronic device as claimed in claim 14, wherein said first operable direction is defined along a lengthwise direction of said one housing and said second operable direction is defined along a breadthwise direction of said one housing.

* * * * *